Jan. 11, 1966  B. TRAVIS  3,228,663
MORTAR MIXER
Filed Aug. 19, 1964  3 Sheets-Sheet 1
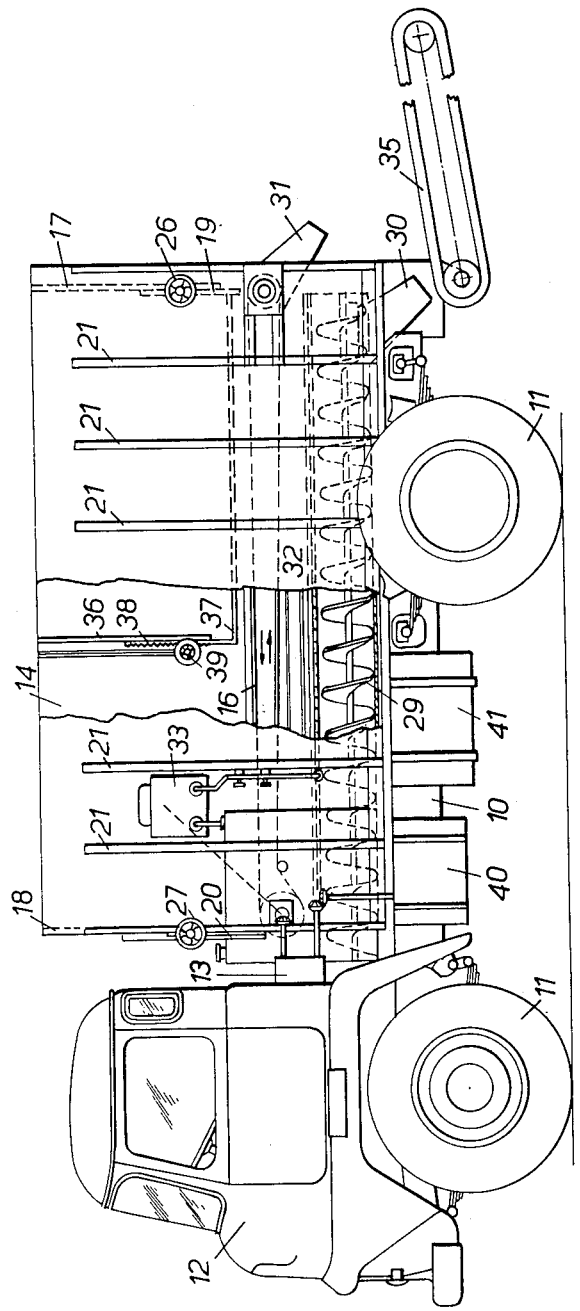
INVENTOR:
BEN TRAVIS
BY
ATTORNEYS Jan. 11, 1966    B. TRAVIS    3,228,663
MORTAR MIXER
Filed Aug. 19, 1964    3 Sheets-Sheet 2
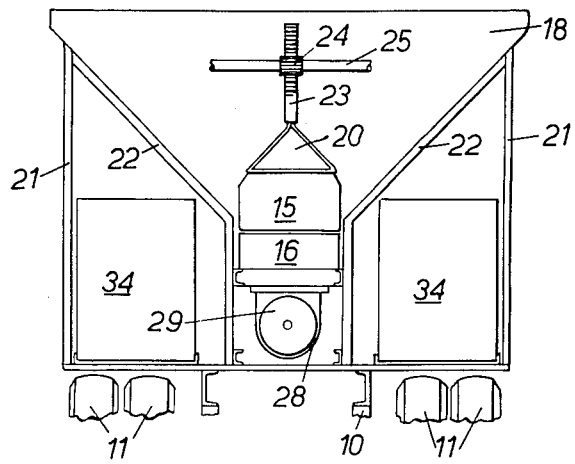
— FIG. 2. —
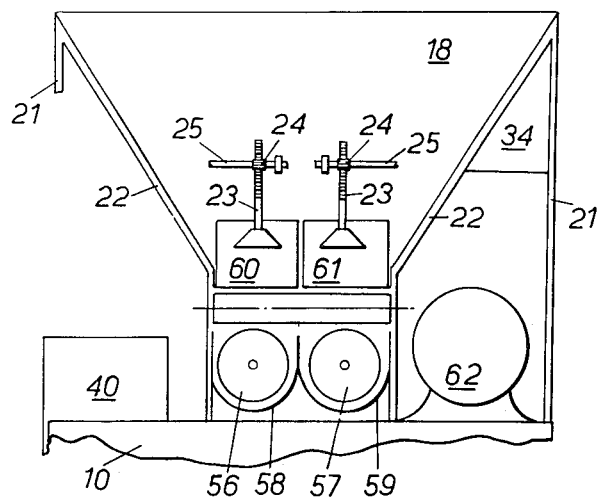
— FIG. 4. —
INVENTOR:
BEN TRAVIS
BY
Driskin & Goldfarb
ATTORNEYS Jan. 11, 1966   B. TRAVIS   3,228,663
MORTAR MIXER
Filed Aug. 19, 1964   3 Sheets-Sheet 3
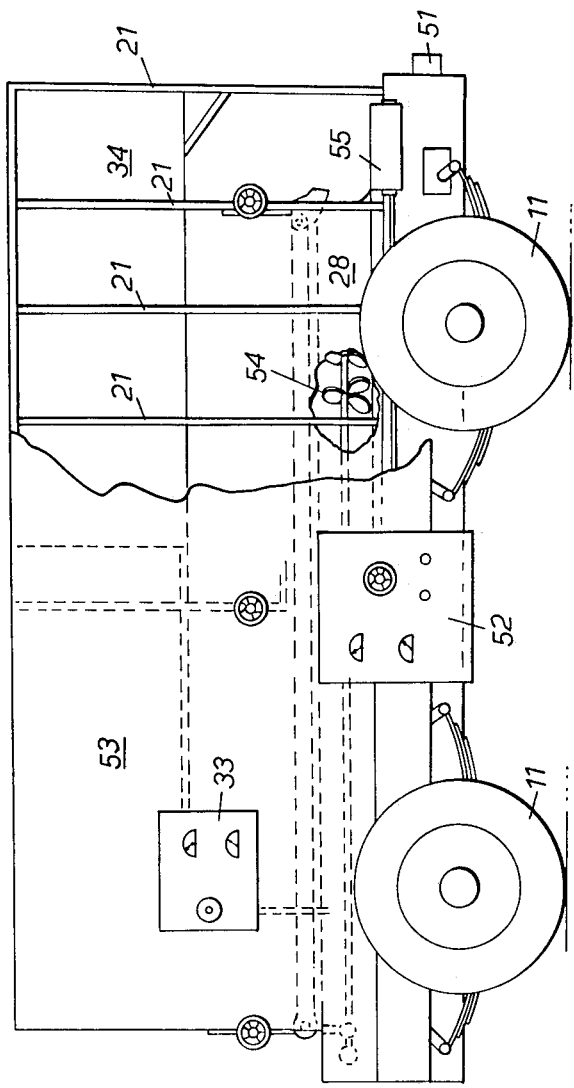
INVENTOR:
BEN TRAVIS
BY
ATTORNEYS United States Patent Office 3,228,663
Patented Jan. 11, 1966

3,228,663
MORTAR MIXER
Ben Travis, Chester, England
Filed Aug. 19, 1964, Ser. No. 390,514
Claims priority, application Great Britain, Aug. 20, 1963,
32,805/63
17 Claims. (Cl. 259—161)

The present invention relates to mobile mixers for such items as batch concrete. By a mobile mixer is meant a mixer which can be readily moved from place to place and which is provided with sufficient camping capacity within itself to contain a full load of aggregate and a corresponding full load of water, in order that it may convey from source to an off-loading point all those things which it requires without the need to be accompanied by servicing vehicles or the like.

It is normal practice to supply batch concrete to remote sites either by transporting prepared batches of premixed concrete to the sites in transporters provided with heavy rotating containers or by transporting the various ingredients to the sites and there mixing them together in mixers which are distinct from the ingredient transporters, and therefore have to be taken to the sites in addition to the ingredient transporters.

In the first case mentioned above, little handling on the sites is involved, but the prime movers of the transporters are required to move the dead weight of the rotating gear for the premixed batch.

In the second of the above mentioned cases, a large amount of work is involved in dumping the various ingredients at the site and in subsequently loading the ingredients into one or more mixers, although the nonproductive loading of the transporters is greatly reduced.

It is an object of the present invention to provide a mobile mixer having a transporting container and possessing, to a certain degree, the advantages of both the systems hereinbefore described.

Accordingly, the present invention provides a mobile mixer comprising a chassis mounted on road wheels, a container for substantially dry mixes mounted on the chassis, means for introducing water into the continuous mixer and mechanical means for transferring dry mix from the contained into the continous mixer.

The mobile mixer may be in the form of a trailer, that is, adapted to be towed by a tractor, or it may be adapted to be self-propelled, that is to say, the mobile mixer is in the form of a lorry.

The container may be in the form of an open topped hopper, the mechanical means for transferring the dry mix from the container to the continuous mixer comprising a reversible conveyor forming the floor of the container.

The continuous mixer may comprise a tube or trough containing a scroll and/or paddle-bladed mixer, and the tube or trough may run the length of the chassis, below the container and below the conveyor, parallel threwith. In this way, the running of the conveyor in one direction of operation thereof can be arranged to discharge into an open of the tube or trough.

The continuous mixer may be arranged to discharge onto a conveyor boom, and the operation of the container conveyor may be arranged to discharge onto the same boom conveyor when operated in the reverse direction.

The openings in the walls of the container wherethrough discharges the container conveyor may be provided with adjustable control doors, and at least one dividing plate may be provided in the container, and each compartment may be provided with a false bottom which can be raised to permit flow of mix on the conveyor beneath the dividing plate.

The means for introducing water into the continuous mixer may comprise a water container mounted on the chassis and connected for controlled flow of water with the continuous mixer. The water container may be arranged to introduce water into continuous mixer over a major part of the length thereof.

The present invention will be described further with reference to three embodiments of mobile mixer according to the present invention as illustrated in the accompanying drawings in which:

FIG. 1 is a side elevation of one embodiment of mobile mixer according to the present invention, somewhat diagrammatic and partially cutaway to show certain interior parts;

FIG. 2 is a schematic view of the upper part of the mobile mixer of FIG. 1, as seen from behind the cab and looking away therefrom;

FIG. 3 is a side elevation of a second embodiment of of mobile mixer according to the present invention, again somewhat diagrammatic and partially cutaway; and FIG. 4 is a schematic end view of the upper part of a third embodiment of mobile mixer according to the present invention.

Referring now to FIG. 1, a first embodiment of mobile mixer according to the present invention comprises a heavy duty lorry chassis 10 provided with road wheels 11 and a conventional cab 12 containing a motor (not visible). The motor is connected to the rear road wheels 11 to drive the same and to a drive take-off unit 13.

A container 14 for substantially dry mix, for example, a mixture of cement, sand and small aggregate, is mounted on the chassis 10 to the rear of the cab 12. The dry mix container 14 has a triangular cross-section (see FIG. 2) with the longest base uppermost and the opposite apex removed to provide an open strip bottom 15 located centrally of the chassis and running directly rearwardly from just behind the cab 12. The bottom of the container 14 is occupied by a reversible loop-belt conveyor 16. The ends of the container 14 are defined by end plates 17 and 18, through each of which extends the conveyor 16. The openings in the end plates 17 and 18 provided to permit this are closable by respective level control doors 19 and 20. The container 14 is supported from the chassis 10 on struts 21 and 22 which are closed in the side plates (not shown in FIG. 1, but which are similar to those shown in FIG. 3). In order to be able to operate the doors 19 and 20, rack bars 23 are mounted on the doors 19 and 20, extending upwardly. The rack bars 23 are engaged with ratchet wheels 24 mounted on spindles 25 which are operatively linked to respective operating wheels 26 and 27 which are located outside the side plates.

A trough 28 is mounted directly below the conveyor 16 and the trough extends beyond the conveyor 16 at the cab end thereof. The front end of the trough 28 is open at the top thereof and the front end of the conveyor 16 overhangs this open top of the trough 28. A scroll feed 29 is mounted in the trough 28 and terminates just short of the rear end of the conveyor 16. A chute 30 is attached to the lower part of the rear end of the trough 28, and a similar chute 31 is provided just below the rear end of the conveyor 16. The chute 31 extends further rearwardly than does the chute 30.

A regularly apertured pipe 32 runs along the upper part of the trough 28, and this pipe 32 is connected to a water pump 33. The water pump 33 connects, for flow of water, with a twin connected pair of water containers 34, mounted one on each side of the container 14 in the spaces between the container 14 and the side plates and extending downwardly as far as the top of the chassis 10. The water containers are provided with one or more filling cocks (not shown).

The drive take-off is operatively connected to the conveyor 16, the scroll feed 29 and the water pump 33.

In operation, the container is filled at source with dry mix and the water containers 34 are filled with water. The mobile mixer is then driven to the site under the power of the motor. The drive take-off is then actuated to drive the conveyor in the sense indicated by the arrows in FIG. 1, to operate the pump 33 to transfer water from the containers 34 into the trough 28 through the pipe 32 and to rotate the scroll-feed to tend to drive to the rear of the mixer. In this way, the dry mix is fed along the conveyor 16 at a rate controlled by the aperture left between the top of the conveyor 16 and the bottom of the door 20. The dry mix falls over the front end of the conveyor into the trough 28 through the open top of the front thereof and is fed through the trough 28 to the rear of the mixer by the scroll-feed 29. During the passage of the dry mix through the trough, it is mixed with the water from the pipe 32 by the action of the scroll-feed 29. The mixed concrete, for example, resulting from this action issues forth from the chute 30 and is thus off-loaded.

Any dry mix that is not used can be returned to source in the mixer and off-loaded by reversing the sense of operation of the conveyor 16, the mix issuing forth from the chute 31. In order that the mixed cement or the surplus dry mix can be delivered to, or stacked at, a given point with the minimum of difficulty, a boom conveyor 35 may be provided and mounted to the chassis 10 at a point below both the chutes 30 and 31. The fixture for the boom conveyor may be a pin and socket and a branch of the drive take-off 13 may extend to the fixture to power the boom conveyor 35. A stowage position for the boom conveyor 35 may be provided on the chassis 10 alongside the trough 28 for when the boom conveyor is not in use.

It is possible to use a screw conveyor for the boom conveyor with the result that the discharge of the continuous mixer is further mixed in the boom conveyor.

It may be convenient to divide the container 14 by means of an internal plate 36 whereby two loads of differing natures may be transported by the mixer. The compartment divided by plate 36 may be provided with a false bottom 37 attached to rack bars 38 operable by and from operating wheels 39 mounted on the outside of the side plates of the mixer and operable in a similar manner to the doors 19 and 20. In this way, two differing kinds of concrete can be delivered to a site or to two different sites by the mixer, if the false bottom is raised after the first load nearer the cab 12 is off-loaded or one load can be mixed and off-loaded and the other load off-loaded directly, if the false bottom is maintained lowered and the sense of operation of the conveyor is reversed after the first load is off-loaded. In this case, it is immaterial which load is off-loaded first.

The mixer may be provided with an auxiliary power unit 40 which can be linked into the drive take-off 13, and, if this is so, the drive take-off 13 need not be connected to the mixer prime mover. Both the motor and the auxiliary power unit 40 can be fueled from the same fuel tank 41, or separately as is required.

A paddle feed can be used instead of a scroll feed, or alternatively a mixed feed can be used as, for example, a scroll feed having longitudinal paddle blades mounted therein.

The water pump may be provided with a cock whereby the pump can be actuated to draw water from a main or the like and the pump may be drivably linked, not to the drive take-off, but to the conveyor 16 or to the scroll-feed 29. In this way, the amount of water supplied, or the rate of supply thereof, is automatically controlled in response to the rate of feed of the mix to the trough 28 or the rate of operation of the scroll-feed as the case may be.

Thus it will be apparent that there will be a saving in the weight carried in relation to the profitable load supplied at the site due to the fact that the mix is carried dry so that no container rotating gear is required and the distance over which the load is carried is immaterial since the question of the load drying out does not enter into matters.

In passing, it will be appreciated that the weight of the mixing gear is much reduced as compared with conventional drum mixers since the load does not have to be mixed all at the one time.

The mixer can be fully loaded on each journey since the load can be divided in quantity and kind by the use of a suitable number of dividing plates 36 and since any surplus can be returned to source in a usable condition because it will not have been mixed. The mixer can serve as a pick-up on return journeys due to its off-loading capacity.

The weight and the cost of the mobile mixer according to the invention is less than the cost of a conventional drum transporter of similar capacity, and this results in lower running costs and in lower axle loading. Conversely, a mobile mixer according to the invention can carry a higher pay load than can a conventional drum transporter of similar overall weight.

Modifications can be incorporated in the embodiment of the invention just described without departing from the scope of the appended claims.

For example, referring to FIG. 3, a second embodiment of mobile mixer according to the present invention is formed as a trailer and a towing connector is provided on the chassis thereof whereby the mixer can be connected behind a separate self-propelled vehicle.

For the sake of brevity, the parts of the mobile mixer shown in FIG. 3 which correspond to the same or similar parts of the mobile mixer shown in FIGS. 1 and 2 will not be described in detail but will be given the same reference numerals and the differences between the two embodiments will be discussed briefly.

As already mentioned, the mobile mixer of FIG. 3 is formed as a trailer provided with a towing connector 51, and consequently, a separate power unit 40 is required. The power unit 40 is provided with the necessary control panel 52 mounted externally of the side plates 53.

The water containers 34 are mounted at the front of the trailer and at the top thereof. This being so, a gravity feed can be used to transfer water from the containers 34 to the trough 28 through a control instead of by a pump 33 of which, only the control panel is shown. The trough 28, in this case is shown to contain a paddle-feed comprising paddles 54.

It will be noted that the mixer off-loads at the front end thereof, beneath the water containers 34 by discharging onto a lateral conveyor 55 operable from the power unit 40. This arrangement is also possible if the mixer is arranged to be self-propellled. In this case differing loads can be off-loaded to opposite sides of the mixer.

Further, referring to FIG. 4, it will be seen that twin scroll-feeds 56 and 57 can be provided for faster mixing, the feeds being mounted in twin parallel troughs 58 and 59 and the output of the conveyor, which must be of twice the width, can be controlled in separate halves thereof by twin control doors 60 and 61.

The troughs can be replaced by tubes and the fuel tank 62 can be taken up within the side plate covering.

I claim:

1. A mobile mixer comprising a chassis, road wheels mounting said chassis, towing attachment means mounted on said chassis and operable to attach said chassis to a prime mover, dry mix container means having opposing end walls and being mounted on said chassis, a continuous mixer having an open-topped portion mounted on said chassis below said container means, conveyor means mounted in and forming the base of said container means, said conveyor means being reversible and extending through and beyond said opposing end walls of said container means for discharging material beyond said end walls, said conveyor means having one exposed end overlying said open-topped portion of said continuous mixer means to discharge conveyed matter thereinto, water container means mounted on said chassis, water transfer means mounted on said chassis and operatively connected to said water container means and to said continuous mixer means, and a power unit mounted on said chassis and operatively connected with said conveyor means, said water transfer means and said continuous mixer means.

2. A mobile mixer comprising a chassis, road wheels mounted on said chassis and supporting the same, motor means mounted on said chassis and operatively connected with at least two of said road wheels, open topped hopper means mounted on said chassis, reversible conveyor means forming the bottom of said hopper means and passing through and beyond opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween.

3. A mobile mixer comprising a chassis, road wheels mounted on said chassis and supporting the same, motor means mounted on said chassis and operatively connected with at least two of said road wheels, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, and level control door means located in the terminal apertures of said hopper means and of variable separation from said conveyor means controlling the level of matter conveyed by said conveyor means out of said hopper means.

4. A mobile mixer comprising a chassis, road wheels mounted on said chassis and supporting the same, prime mover means mounted on said chassis and operatively connected with at least two of said road wheels, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, dividing means located in said hopper means and dividing said hopper means into distinct compartments, and false bottom means located on the lower parts of said hopper means and actuable to control flow of material on said conveyor means between said compartments.

5. A mobile mixer comprising a chassis, road wheels mounted on said chassis and supporting the same, prime mover means mounted on said chassis and operatively connected with at least two of said road wheels, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis water feed means connecting said water container means and said conduit means for flow of water therebetween, level control door means located in the terminal apertures of said hopper means and of variable separation from said conveyor means controlling the level of matter conveyed by said conveyor means out of said hopper means, dividing plate means located in said hopper means and dividing said hopper means into distinct compartments, and false bottom means located on the lower parts of said hopper means and actuable to control flow of material on said conveyor means between said compartments.

6. A mobile mixer comprising a chassis, road wheels mounted on said chassis and supporting the same, motor means mounted on said chassis and operatively connected with at least two of said road wheels, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, first chute means, said first chute means being mounted on the end of said conduit means remote from the upper aperture thereof, and second chute means, said second chute means being mounted on said container means under the end of said conveyor means remote from said end thereof over the upper aperture of said conduit means.

7. A mobile mixer comprising a chassis, road wheels mounted on said chassis and supporting the same, motor means mounted on said chassis and operatively connected with at least two of said road wheels, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, level control door means located in the terminal apertures of said hopper means and of variable separation from said conveyor means controlling the level of matter conveyed by said conveyor means out of said hopper means, dividing plate means located in said hopper means and dividing said hopper means into distinct compartments, false bottom means located on the lower parts of said hopper means and actuable to control flow of material on said conveyor means between said compartments, first chute means mounted on the end of said conduit means remote from the upper aperture thereof, second chute means mounted on said container means under the end of said conveyor means remote from said end thereof over the upper aperture of said conduit means.

8. A mobile mixer comprising a chassis, road wheels mounted on said chassis and supporting the same, motor means mounted on said chassis and operatively connected with at least two of said road wheels, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, level control door means located in the terminal apertures of said hopper means and of variable separation from said conveyor means controlling the level of matter conveyed by said conveyor means out of said hopper means, dividing plate means, located in said hopper means and dividing said hopper means into distinct compartments, false bottom means located on the lower parts of said hopper means and actuable to control flow of material on said conveyor means between said compartments, first chute means mounted on the end of said conduit means remote from the upper apertures thereof, second chute means mounted on said container means under the end of said conveyor means remote from said end thereof over the upper aperture of said conduit means, lateral conveyor means mounted on said chassis under both said first and second chute means and operable to remove material discharged from said first and second chute means laterally of said chassis.

9. A mobile mixer comprising a chassis, road wheels mounted on said chassis and supporting the same, motor means mounted on said chassis and operatively connected with at least two of said road wheels, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, level control door means located in the terminal apertures of said hopper means and of variable separation from said conveyor means controlling the level of matter conveyed by said conveyor means out of said hopper means, dividing means located in said hopper means and dividing said hopper means into distinct compartments, false bottom means located on the lower parts of said hopper means and actuable to control flow of material on said conveyor means between said compartments, first chute means mounted on the end of said conduit means remote from the upper aperture thereof, second chute means mounted on said container means under the end of said conveyor means remote from said end thereof over the upper aperture of said conduit means and boom conveyor means mounted on said chassis and operable to off-load material discharged through said first and second chute means.

10. A mobile mixer comprising a chassis, road wheels mounted on said chassis and supporting the same, motor means mounted on said chassis and operatively connected with at least two of said road wheels, open topped hopper means mounted on said chassis, reversible conveyor means forming the bottom of said hopper means and passing through opposed terminal apertures in said hopper means, conduit means mounted on said chassis below said conveyor means and provided with an upper aperture below one of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, level control door means located in the terminal apertures of said hopper means and of variable separation from said conveyor means controlling the level of matter conveyed by said conveyor means out of said hopper means, dividing plate means located in said hopper means and dividing said hopper means into distinct compartments, false bottom means, located on the lower parts of said hopper means and actuable to control flow of material on said conveyor means between said compartments, first chute means mounted on the end of said conduit means remote from the upper aperture thereof, second chute means mounted on said container means under the end of said conveyor means remote from the end thereof over the upper aperture of said conduit means, lateral conveyor means mounted on said chassis under both said first and second chute means and operable to remove material discharged from said first and second chute means laterally of said chassis, boom conveyor means mounted on said chassis and operable to off-load material discharged through said first and second chute means, a drive power unit mounted on said chassis and drive take-off means, said drive take-off means being operatively connected with, on the one hand, at least one of said motor means and said drive power unit, and, on the other hand, to said conveyor means, said lateral conveyor means, said boom conveyor means, said combined means and said water feed means to actuate the same.

11. A mobile mixer comprising a chassis, road wheels mounted on said chassis and supporting the same, towing attachment means mounted on said chassis and operable to attach said chassis to a prime mover, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis and water feed means connecting said water container means and said conduit means for flow of water therebetween.

12. A mobile mixer comprising a chassis, road wheels mounted on said chassis and supporting the same, towing attachment means mounted on said chassis and operable to attach said chassis to a prime mover, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween and a drive power unit, said drive power unit being mounted on said chassis and connected to said conveyor means and said combined means and actuable to drive the same.

13. A mobile mixer comprising a chassis, road wheels mounted on said chassis and supporting the same, towing attachment means mounted on said chassis and operable to attach said chassis to a prime mover, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, level control door means located in the terminal apertures of said hopper means and of variable separtion from said conveyor means controlling the level of matter conveyed by said conveyor means out of said hopper means and a drive power unit, said drive power unit being mounted on said chassis and connected to said conveyor means and said combined means and actuable to drive the same.

14. A mobile mixer comprising a chassis, road wheels mounted on said chassis and supporting the same, towing attachment means mounted on said chassis and operable to attach said chassis to a prime mover, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, level control door means located in the terminal apertures of said hopper means and of variable separation from said conveyor means controlling the level of matter conveyed by said conveyor means out of said hopper means, dividing plate means located in said hopper means and dividing said hopper means into distinct compartments, false bottom means located on the lower parts of said hopper means and actuable to control flow of material on said conveyor, conveyor means between said compartments, and a drive power unit, said drive power unit being mounted on said chassis and connected to said conveyor means and said combined means and actuable to drive the same.

15. A mobile mixer comprising a chassis, road wheels mounted on said chassis and supporting the same, towing attachment means mounted on said chassis and operable to attach said chassis to a prime mover, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said upper aperture, water container means mounted on said chassis, water feed means connecting said water container means and said conduit means for flow of water therebetween, level control door means located in the terminal apertures of said hopper means and of variable separation from said conveyor means controlling the level of matter conveyed by said conveyor means out of said hopper means, dividing plate means located in said hopper means and dividing said hopper means into distinct compartments, false bottom means located on the lower parts of said hopper means and actuable to control flow of material on said conveyor means between said compartments, first chute means mounted on the end of said conduit means remote from the upper aperture thereof, second chute means mounted on said container means under the end of said conveyor means remote from said end thereof over the upper aperture of said conduit means and a drive power unit, said drive power unit being mounted on said chassis and connected to said conveyor means, said water feed means and said combined means and actuable to drive the same.

16. A mobile mixer comprising a chassis, road wheels mounted on said chassis and suporting the same; towing attachment means mounted on said chassis and operable to attach said chassis to a prime mover, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof along said conduit means away from said aperture, water container means mounted on said chassis, water feed means connecting said water container means and said conduit means for flow of water therebetween, level control door means located in the terminal apertures of said hopper means and of variable separation from said conveyor means controlling the level of matter conveyed by said conveyor means out of said hopper means, dividing plate means located in said hopper means and dividing said hopper means into distinct compartments, false bottom means located on the lower parts of said hopper means and actuable to control flow of material on said conveyor means between said compartments, first chute means mounted on the end of said conduit means remote from the upper aperture thereof, second chute means mounted on said container means under the end of said conveyor means remote from said end thereof over the upper aperture of said conduit means, boom conveyor means mounted on said chassis and operable to off-load material discharged through said first and second chute means, and a drive power unit, said drive power unit being mounted on said chassis and connected to said conveyor means, said water feed means and said combined means and actuable to drive the same.

17. A mobile mixer comprising a chassis, road wheels mounted on said chassis and supporting the same, towing attachment means mounted on said chassis and operable to attach said chassis to a prime mover, open topped hopper means mounted on said chassis, reversible conveyor means forming the bottom of said hopper means and passing through opposed terminal apertures in said hopper means, conduit means mounted on said chassis below said conveyor means and provided with an upper aperture below one end of said conveyor means, combined rotary mixing and feeding means mounted along the length of said conduit means and operable to feed material falling from said conveyor means into said conduit means through the upper aperture thereof, along said conduit means away from said upper aperture, water container means mounted on said chassis, water feed means connecting said water container means and said conduit means for flow of water therebetween, level control door means located in the terminal apertures of said hopper means and of variable separation from said conveyor means controlling the level of matter conveyed by said conveyor means out of said hopper means, dividing plate means located in said hopper means and dividing said hopper means into distinct compartment, false bottom means located on the lower parts of said hopper means and actuable to control flow of material on said conveyor means between said compartments, first chute means mounted on the end of said conduit means remote from the upper aperture thereof, second chute means mounted on said container means under the end of said conveyor means remote from said end thereof over the upper aperture of said conduit means, lateral conveyor means mounted on said chassis under both said first and second chute means and operable to remove material discharged from said first and second chute means laterally of said chassis, and a drive power unit, said drive power unit being mounted on said chassis and connected to said conveyor means and said combined means and actuable to drive the same.

References Cited by the Examiner

UNITED STATES PATENTS

| | | | |
|---|---|---|---|
| 1,492,061 | 4/1924 | Averill | 259—169 |
| 1,724,850 | 8/1929 | Owen | 259—165 |
| 2,873,036 | 2/1959 | Noble | 259—154 |
| 2,946,597 | 7/1960 | Simonsen | 259—154 |

WALTER A. SCHEEL, *Primary Examiner.*